United States Patent Office 3,399,189
Patented Aug. 27, 1968

3,399,189
TAMARIND EXTRACT
Arthur L. Gordon, Des Plaines, Ill., assignor to National Dairy Products Corporation, New York, N.Y., a corporation of Delaware
No Drawing. Filed Feb. 25, 1966, Ser. No. 529,939
12 Claims. (Cl. 260—209)

The present invention generally relates to tamarind seed and more particularly relates to tamarind seed polysaccharides and to a method for recovering such polysaccharides.

Polysaccharides obtained by extraction from the kernel of seeds of the tamarind tree, Tamarindus indica Linn., are known industrial gums. Such tamarind polysaccharides form mucilaginous dispersions with water and possess the characteristic property of forming gels with sugar concentrates, as do fruit pectins. However, the tamarind polysaccharides differ from other fruit pectins in that tamarind polysaccharides are capable of forming gels over a wide pH range, including neutral and basic pH conditions.

Another advantage which tamarind polysaccharides possess over the fruit pectins is that they are not affected by boiling in neutral aqueous solutions even for as long as two hours. Fruit pectins on the other hand, undergo degradation on boiling; their gelling power falls to one-third of the original value after boiling for an hour. For these and other reasons, it would be desirable to provide an improved method for separating tamarind polysaccharides from the seed kernels.

Prior art methods for separating polysaccharides from tamarind kernels have utilized their solubility in hot aqueous solutions. A substantial proportion of the remainder of the kernel, which includes protein, fat, and kernel fibers, is insoluble. Such prior art methods, however, are not advantageous because extremely high proportions of water are required for effective extraction. They are further undesirable in that certain fats and oils and inorganic components in the remainder of the tamarind kernel are partially soluble in the water extract and may undesirably affect filterability and clarity of the extract or they may impart off flavors to any resultant products in which the polysaccharides are used.

Accordingly, it is the principal object of the present invention to provide improved tamarind polysaccharides. It is another object of the invention to provide an improved method for their recovery. A further object of the present invention is to provide an improved method for the extraction of polysaccharides from tamarind kernels.

Further objects and advantages will be apparent from a study of the following detailed description.

Generally, in accordance with the present invention, tamarind kernels are subjected to a first extraction with a suitable organic solvent to provide an organic extract. Thereafter, the tamarind kernels are subjected to a second extraction with an aqueous solvent to provide an aqueous extract. The aqueous extract may thereafter be subjected to further treatment to recover tamarind polysaccharides therefrom.

In this connection, treatment of tamarind kernels, in accordance with this invention, by a first extraction with an organic solvent provides an aqueous filtrate containing polysaccharides from the second water extraction that is considerably clearer and easier to filter than if the polysaccharides are extracted from the tamarind kernels using a water extraction step alone. The first extraction with an organic solvent also provides a polysaccharide product that is free from the bitter flavor and rancid aroma normally associated with polysaccharides extracted from tamarind kernels with water alone.

The present invetnion includes a method whereby tamarind polysaccharides can be prepared in highly pure form and on a small or large scale, batchwise or continuously. Furthermore, the present invention provides improved polysaccharides suitable for gelling sugar syrups at various levels of pH and which are not affected by prolonged periods of boiling.

More particularly, in the practice of the present invention, tamarind kernel powder, hereinafter referred to as TKP, is utilized. TKP is a commercially available product obtained by separating the hull of tamarind seeds from the kernel and grinding the kernel. For purposes of this invention the mesh size of the TKP is not critical and may range from a coarsely ground material to a finely ground material. However, the time required for complete extraction of the polysaccharide from the TKP is proportional to the particle size of the powder; hence it is preferred to use TKP having a mesh size less than about 40, Tyler Standard Sieve.

In addition to its polysaccharide content, TKP comprises a mixture of proteins, fiber, fat, inorganic salts, and tannins. The first extraction with an organic solvent removes most of the proteins and fat. Since these components are also partially or wholly soluble in water, the first extratcion prevents these components from interfering with the second aqueous extraction of the polysaccharides, and from contributing undesirable taste or flavor to the polysaccharides. Although the reasons are not clearly understood, the first extraction appears also to be responsible for effecting the aqueous extraction of the pure polysaccharides with a lower level of water than has heretofore been possible.

The first extraction may be effected by numerous organic solvents which will dissolve the undesirable proteins and fats and in which the polysaccharides have limited solubility. Preferred organic solvents are polar organic compounds, such as alcohols, aldehydes, ketones and ethers, and such polar organic compounds which contain mixed functional groups. A preferred group of polar organic compounds are short chain aliphatic alcohols or polyols, having from 1 to 4 carbon atoms. A particularly preferred organic compound is isopropanol.

The level of organic solvent required for effecting the first extraction is not critical, however a sufficient quantity should be used to form a free flowing slurry that may be readily filtered. This may be accomplished at levels of organic solvent to TKP of from about 5:1 to about 10:1 by weight. The first extraction is most effectively carried out at elevated temperatures of from about 75° C. to about 85° C., although lower temperatures may be used if the extraction time is extended. After the first extraction is completed, the slurry mixture is filtered by any suitable method whereby the filter cake may be recovered without contamination. The recovered filter cake, containing the polysaccharides along with some protein, fat and the fiber of the TKP, is dried at a low temperature to prevent degrading the polysaccharide and is then used for the second extraction of the polysaccharide with water.

According to the practice of this invention, the dried organic extracted TKP is contacted with from about 25 to about 35 times its own weight of water. The resulting slurry is warmed to from about 165° F. to about 205° F. to effect more rapid dissolution of the polysaccharides. After holding for a suitable time at the elevated temperature the dissolved polysaccharides are separated from the undissolved TKP by filtration. The pure polysaccharides are then recovered from the dilute filtrate solution by any suitable separation process, such as roll drying or alcohol precipitation.

When roll drying is used to effect recovery of the polysaccharides from the filtrate of the water extraction, it has been discovered that unless the dilute solution of polysaccharides is combined with a suitable parting agent prior to roll drying, the polysaccharides tend to form a gummy cohesive mass on the rolls that is extremely difficult to remove. Consequently, an important step, when roll drying is used to recover the polysaccharides from the filtrate, involves the addition of a parting agent to the filtrate prior to drying. Lecithin has been found to be a particularly effective parting agent for this purpose. However, when used in quantities sufficient to be effective, lecithin tends to impart off flavors to the polysaccharides that may be detected in subsequent food products in which the polysaccharides may be employed. Also the stability of lecithin under extended periods of storage is not advantageous. This may be overcome by using lecithin in combination with other parting agents, such as glycerol monostearate or polysorbitans. An example of commercially available glycerol monostearate is available under the trade name Myverol 1800, and Myverol 1807. One such polysorbitan is commercially available under the trade name Hodag PSMO 20, which is polyoxyethylene (20) sorbitan monoleate.

Lecithin may be combined with glycerol monostearate or polysorbitans at weight ratios from about 1:1 to about 1:5. A particularly preferred combination is one part lecithin to three parts of glycerol monostearate. The lecithin mixtures when added to the filtrate solution as a parting agent, at a level of from about 3 percent to about 7 percent by weight based on the weight of polysaccharides present, permit effective roll drying with good parting characteristics and without imparting off flavors to the polysaccharides.

The roll drying characteristics of tamarind polysaccharides may also be improved by adding sucrose to the filtrate solution of polysaccharides. At ratios of sucrose to polysaccharides of from about 0.95:1 to about 1.35:1 by weight based on the amount of polysaccharides in the filtrate solution, the dried polysaccharide/sucrose mixture may be completely removed from the rolls in a single pass leaving clean rolls. Higher levels of sucrose provide greater improvement in roll drying characteristics. However, when the level of sucrose is increased, there is also an increase in softness of the gel characteristics of products prepared from the resultant roll dried product. It is therefore preferred not to use sucrose addition levels above a weight ratio of about 1.35:1; a particularly preferred ratio is about 1.1:1.

Various advantages and features of the method and product of this invention are presented more specifically in the following examples.

EXAMPLE I

A first extraction of five hundred pounds of TKP with isopropanol was performed in the following manner. Six hundred gallons of isopropanol were charged into a stainless steel steam jacketed kettle equipped with a stirrer, a thermometer, and a condenser top with addition ports. The TKP was added to the kettle while the isopropanol was agitated. The temperature of the resulting alcohol slurry was brought to 78° C. and was held for 1 hour at that temperature with continuous stirring after which the slurry was cooled to 30° C. by passing cold water through the jacket. The alcohol slurry of TKP was centrifuged and the wet cake was collected and vacuum dried. The resultant product was screened and stored for use in the following examples wherein the tamarind polysaccharides were recovered by water extraction.

EXAMPLE II

Tamarind polysaccharides were recovered from the organic solvent first extraction of TKP of Example I according to the following procedure. Approximately 450 gallons of cold water and 200 pounds of filter aid were added to a 1500 gal. capacity stainless steel tank. 240 pounds of the dried product of Example I were added to form a slurry while the water was agitated. The slurry was diluted to 1000 gal. and steam was used to warm the slurry to 185° F. over a period of one hour. The agitated slurry was held at that temperature for 30 minutes. The slurry was then pumped to a pressurized holding tank and subsequently filtered through a plate and frame filter press. 800 gallons of filtrate were recovered and were found to contain 130 pounds of tamarind polysaccharides; a level of 54 weight percent.

The clarity of the filtrate was determined using a Klett-Summerson spectrophotometer equipped with a 420 millimicron blue filter, wherein the optical density or light transmittance of the sample is measured. The instrument is scaled so that an opaque sample has a value of 1.000, while a clear sample is 0. The results are presented below in Table I and are compared with filtrate samples obtained by water extraction alone, without the first organic solvent extraction as described in Example I.

TABLE I

| Sample Number | Sample Description | Temperature at Extraction (°F.) | Klett-Summerson Reading |
|---|---|---|---|
| 1 | First organic solvent extraction, second water extraction. | 185 | 0.062 |
| 2 | Water extraction only | 185 | 0.360 |
| 3 | do | 212 | 0.440 |

EXAMPLE III

The filtrate from Example II containing dissolved polysaccharides of tamarind seed kernel was combined with various parting agents and dried on conventional roll drying apparatus containing doctor blades for removal of the dried film. The dried polysaccharides were then used in preparing grape jelly according to standard formulae except that the tamarind polysaccharides were used to replace fruit pectin. The roll drying characteristics and resulting jelly properties of the various samples are presented in Table II along with a control sample wherein the polysaccharides are extracted by a water extraction step only.

TABLE II

| Sample No. | Parting Agent Composition | Level-expressed as weight percent of polysaccharides | Roll drying characteristics | Jelly Properties |
|---|---|---|---|---|
| 1 | 100% glycerol monostearate | 5 | Fair to good 1 and 2 pass | Excellent flavor, low turbidity, gel average. |
| 2 | 75% glycerol monostearate, 25% lecithin. | 5 | Good, mostly 1 pass | Excellent flavor, low turbidity, gel average. |
| 3 | 75% polysorbitan, 25% lecithin | 5 | Good, mostly 1 pass | Excellent flavor, low turbidity, gel average. |
| 4 | 5.3% glycerol monostearate, 94.7% sucrose. | 95 | Very good, single pass, clean rolls | Excellent flavor, low turbidity, gel average. |
| 5 | 4.2% glycerol monostearate, 95.8% sucrose. | 117.8 | Very good to excellent, single pass, clean rolls. | Excellent flavor, low turbidity, gel average. |
| 6 | 3.6% glycerol monostearate, 96.4% sucrose. | 139.2 | Very good product, somewhat gummy, single pass, clean rolls. | |
| 7 | 100% glycerol monostearate | 5 | Fair to good 1 and 2 pass | Bitter flavor, moderately turbid, hazy, gel average. |

From the above table, it is readily apparent that a unique polysaccharide product has been provided that is useful as a gel formation agent and which may be substituted for fruit pectins. The polysaccharide product may be efficiently and economically recovered from a filtrate solution by roll drying with suitable parting agents. Due to the inert, tasteless, colorless, odorless, and colloidal properties of the polysaccharides of this invention, their use in a number of industries in addition to those of food and textiles is indicated. They have demonstrated ability to serve as thickeners, stabilizers, adhesives, emulsifying agents and binding agents. In addition, because tamarind seed polysaccharides have many properties similar to those of fruit pectins they may find use as a pharmaceutical product.

Accordingly, a product and a process have been provided for a unique polysaccharide product that is useful as a substitute for fruit pectins. It will be understood that various changes and modifications may be made in the specific examples recited herein without departing from the spirit and scope of the present invention.

Various features of the present invention are set forth in the following claims.

What is claimed is:

1. A process for recovering an improved polysaccharide from tamarind seed kernels which comprises, in combination, the steps of grinding tamarind seed kernels to provide tamarind kernel powder, treating the tamarind kernel powder with a polar organic compound selected from the class consisting of alcohols, aldehydes, ketones, polyols and ethers, said polar organic compound being present at a level sufficient to provide a fluid slurry, recovering the treated tamarind kernel powder from the polar organic compound, contacting the treated tamarind kernel powder with a substantial excess of water with respect to the weight of the tamarind kernel powder so as to extract the polysaccharides, separating the water, containing polysaccharides, from the remaining tamarind kernel powder, and recovering the polysaccharides from the water.

2. The process of claim 1 in which the polar organic compound is a short chain aliphatic alcohol or polyol, having from 1 to 4 carbons.

3. The process of claim 1 in which the polar organic compound is isopropanol.

4. The process of claims 1, 2, or 3 in which the polysaccharide extract is separated from the treated tamarind seed kernel by filtration.

5. The process of claim 4 in which the polysaccharide is recovered from the aqueous filtrate by roll drying.

6. The process of claim 4 in which the polysaccharide is recovered from the aqueous filtrate by adding ethyl alcohol.

7. The process of claim 5 in which a parting agent is added to the aqueous filtrate.

8. The process of claim 7 in which the parting agent is a mixture of lecithin and glycerol monostearate added at a level of from about 3 percent to about 7 percent based on the weight of the polysaccharide.

9. The process of claim 7 in which the parting agent is a mixture of lecithin and polysorbitans added at a level of from about 3 percent to about 7 percent based on the weight of the polysaccharide.

10. The process of claim 7 in which sucrose is added at a weight ratio of polysaccharides of from about 0.95:1 to about 1.35:1.

11. The process of claim 1 wherein said water is heated to a temperature of from about 165° F. to about 205° F.

12. The process of claim 1 wherein the substantial excess of water is at least about 25 times by weight of the tamarind kernel powder.

References Cited

UNITED STATES PATENTS 3,309,356   3/1967   Esterer _____ 260—209
3,287,350   11/1966   Deguchi et al. _____ 260—209

OTHER REFERENCES

G. R. Savr et al., Isolation and Characterization of Tamarind Seed Polysaccharide, J. Biol. Chem. 179, pp. 501–509 (1948).

DONALD E. CZAJA, *Primary Examiner.*

R. W. MULCAHY, *Assistant Examiner.*